United States Patent
Peretz et al.

(10) Patent No.: US 12,340,052 B2
(45) Date of Patent: Jun. 24, 2025

(54) TOUCHPAD FINGER FORCE WITH PALM

(71) Applicant: Microsoft Technology Licensing, LLC, Redmond, WA (US)

(72) Inventors: Ahia Peretz, Elkana (IL); Shiran Barnea, Herzliya (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/477,352

(22) Filed: Sep. 28, 2023

(65) Prior Publication Data

US 2025/0094000 A1 Mar. 20, 2025

Related U.S. Application Data

(60) Provisional application No. 63/583,979, filed on Sep. 20, 2023.

(51) Int. Cl.
*G06F 3/041* (2006.01)
*G06F 3/044* (2006.01)

(52) U.S. Cl.
CPC ........ *G06F 3/04186* (2019.05); *G06F 3/0414* (2013.01); *G06F 3/0445* (2019.05); *G06F 2203/04104* (2013.01)

(58) Field of Classification Search
CPC .. G06F 3/04186; G06F 3/0414; G06F 3/0445; G06F 2203/04104
See application file for complete search history.

(56) References Cited

U.S. PATENT DOCUMENTS

| | | | |
|---|---|---|---|
| 8,577,644 B1 | 11/2013 | Ksondzyk et al. | |
| 2010/0127995 A1 | 5/2010 | Rigazio et al. | |
| 2019/0361563 A1* | 11/2019 | Yang | G06F 3/0446 |
| 2020/0064960 A1* | 2/2020 | Munemoto | G06F 18/24 |
| 2020/0387245 A1* | 12/2020 | Chen | G06F 3/0202 |
| 2022/0147246 A1 | 5/2022 | Rosenberg | |
| 2022/0171519 A1 | 6/2022 | Garg et al. | |
| 2022/0326777 A1 | 10/2022 | Ligtenberg et al. | |

FOREIGN PATENT DOCUMENTS

WO 2022049366 A1 3/2022

OTHER PUBLICATIONS

Coppock, Mark, "Your next laptop may have a haptic touchpad, and that's good", Retrieved from: https://www.digitaltrends.com/computing/next-laptop-may-have-haptic-touchpad-and-thats-good/, Mar. 15, 2022, 33 Pages.

Gu, et al., "LongPad a Touchpad Using the Entire Area Below the Keyboard of a Laptop Computer", Human Factors in Computing Systems, Apr. 27, 2013, pp. 1421-1430.

International Search Report and Written Opinion received for PCT Application No. PCT/US2024/042182, Nov. 25, 2024, 15 pages.

\* cited by examiner

*Primary Examiner* — Peter D McLoone
(74) *Attorney, Agent, or Firm* — Alleman Hall & Tuttle LLP

(57) ABSTRACT

Methods and computing devices for estimating a finger force exerted on a touchpad are disclosed. In one example, a method comprises calculating a plurality of forces produced by a palm at a plurality of capacitive force sensors of the touchpad, where at least one of the sensors is saturated. After calculating the forces produced by the palm, the method determines that the touchpad is being contacted by the palm and a finger. The method uses the forces produced by the palm to determine the finger force exerted on the touchpad by the finger.

20 Claims, 9 Drawing Sheets

TOUCHPAD FINGER FORCE WITH PALM

CROSS REFERENCE TO RELATED APPLICATIONS

This application claims priority to U.S. Provisional Patent Application Ser. No. 63/583,979, filed Sep. 20, 2023, the entirety of which is hereby incorporated herein by reference for all purposes.

BACKGROUND

Some computing devices include a force sensing touchpad for receiving user inputs. In some of these devices, the touchpad utilizes capacitance measurements to estimate a force applied to the touchpad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to computing devices and related methods for estimating a finger force exerted by a finger on a touchpad in a computing device. In one example, a computing device comprises a force sensing touchpad that includes a base plate comprising a plurality of base electrodes. A plurality of capacitive force sensors are resiliently spaced from the base plate. The computing device includes a processor and memory storing instructions executable by the processor to calculate a plurality of forces produced by a palm at the plurality of capacitive force sensors, wherein at least one of the sensors is saturated. After calculating the plurality of forces produced by the palm, the instructions determine that the touchpad is being contacted by the palm and a finger. The plurality of forces produced by the palm are used to determine the finger force exerted on the touchpad by the finger.

DETAILED DESCRIPTION

Figure 1:
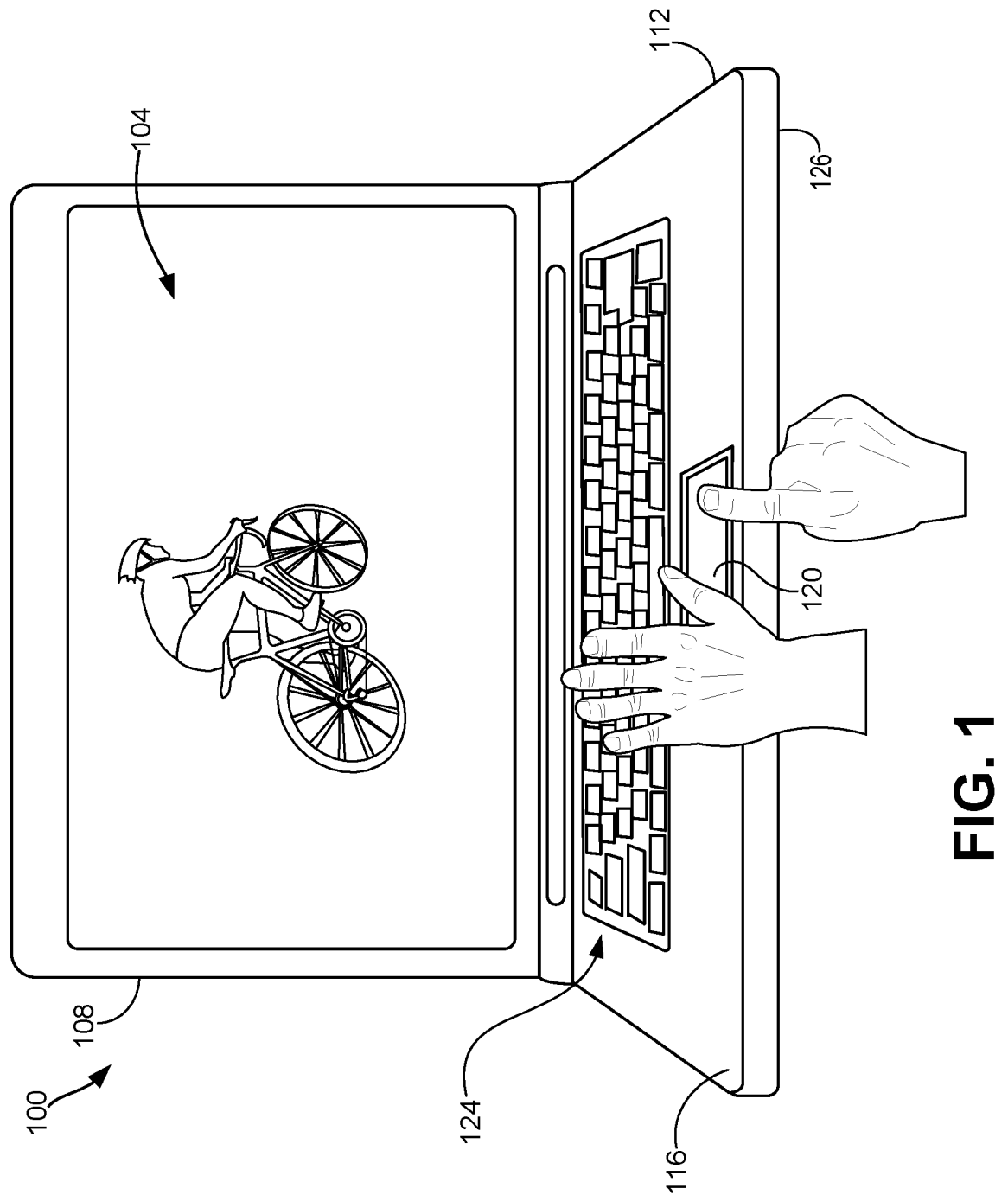
FIG. 1 shows one example of a computing device utilizing a touchpad according to examples of the present disclosure.

Some computing devices include a touchpad for receiving user inputs. Force sensing touchpads can determine various magnitudes of force being applied to their surfaces. The different levels of force can be utilized to provide different forms of user input and user interface features. In some of these devices, the touchpad utilizes capacitance measurements to estimate a force applied to the touchpad. For example, in some devices a printed circuit board (PCB) is affixed to a cover glass assembly and resiliently supported over a base plate connected to electrical ground. In some examples, the PCB can be resiliently supported by one or more springs for relative movement toward and away from the base plate. One or more sensing pads (electrodes) are located between the PCB and the base plate. In such implementations, the capacitance between the sensing pads and the grounded base plate is a function of the distance between the sensing pads and the base plate.

In these examples, a capacitive force transducer can utilize displacement as a proxy for force. When a force applied to the cover glass assembly compresses the spring and reduces the distance between the sensing pads and the base plate, the capacitance changes. In this model, the capacitance is directly proportional to the applied force.

In one example, where the area of an electrode is represented by $A_{pad}$, the initial distance between the electrode and the base plate is $d_0$, and the change in the distance as a result of a force F applied by a user is $d(F)=F/K$, the capacitance as a result of the Force F is given by the following equation 1.1:

$$\text{Capacitance (Force)} = \varepsilon \frac{A_{pad}}{d_0 - d(F)} = \varepsilon \frac{A_{pad}}{d_0 - \frac{F}{K}} \quad 1.1$$

where K is the spring constant of the spring between the PCB and the base plate, F is the force applied by the user on the touchpad, and $\varepsilon$ is the permittivity of the medium in the gap between the electrode and the base plate. In this manner, a measured change in capacitance can be used to calculate the magnitude of the applied force F. In different examples, calculating the magnitude of the applied force F can include utilizing one or more formulae, such as equation 1.1, accessing precalculated data such as one or more lookup tables, and various combinations of the foregoing.

In some devices that utilize touchpads with capacitive force transducers, the packaging space available for the touchpad components can be limited. For example, a laptop utilizing a touchpad mounted in a chassis can have design objectives that include making the chassis as thin as possible. In these cases, the distance available between the sensing pads and opposing base plate is limited, which restricts the amount of travel of the sensing pads. Accordingly, when sufficient force is applied a sensing pad can "bottom out" and contact the base plate, such that further increases in force on the touchpad do not cause further movement of the sensing pad, and thus no additional force measurements are possible, thereby limiting the dynamic range of the force sensing. For example, where a user rests one palm on the trackpad and presses a finger of her other hand on the trackpad to provide input, the larger force applied by her palm can exceed a force threshold for triggering input, thereby preventing the user from providing input using her other finger.

In other examples a much stiffer spring can be used to increase the maximum force available before a sensing pad bottoms out. However, using a stiffer spring correspondingly reduces the sensitivity of the force sensing.

Accordingly, and as described in more detail below, configurations of the present disclosure provide touchpad configurations and related methods that address one or more drawbacks of prior systems. In some examples, configurations of the present disclosure can accurately estimate a finger force exerted by a finger on a touchpad while the palm of the user's other hand is also contacting the touchpad with a larger force, and in some cases causing saturation of one or more capacitive force sensors of the touchpad. In some examples, the force(s) attributable to one or more saturated sensors are excluded from calculations of the finger force. Additionally and as described in more detail below, some example touchpads of the present disclosure periodically update a saved plurality of forces attributable to a user's palm, thereby increasing the accuracy of the estimated finger force exerted on the touchpad.

With reference now to FIGS. 1-9 and 11, an example computing device 100 is illustrated in the form of a laptop computer that includes a force sensing touchpad 120 for estimating a finger force exerted on the touchpad according to aspects of the present disclosure. In other examples, force sensing touchpads of the present disclosure can be implemented in tablet computing devices, foldable computing devices including multiple touch screens, wearable and other mobile computing devices, and any other type of computing device that utilizes a touchpad.

In this example computing device 100 includes a touch screen display 104 on a display substrate 108 that is rotatably coupled to a chassis 112. The chassis 112 includes a user interaction surface 116 that comprises a force sensing touchpad 120 and keyboard 124, and an opposing rear cover 126. Touchpad 120 is configured to detect touch inputs from a user, including the position and force of a user's finger(s), thumb, palm, and/or other user body parts.

In some examples the touchpad 120 is a mutual capacitance touchpad. In these examples, touch inputs are identified by sampling capacitance between a driving electrode and a sensing electrode. Driving electrodes are arranged in an array within the touchpad 120. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, touchpads employing other touch detection technologies, including but not limited to self-capacitance and projected capacitance touch detection, can be utilized.

Figure 2:
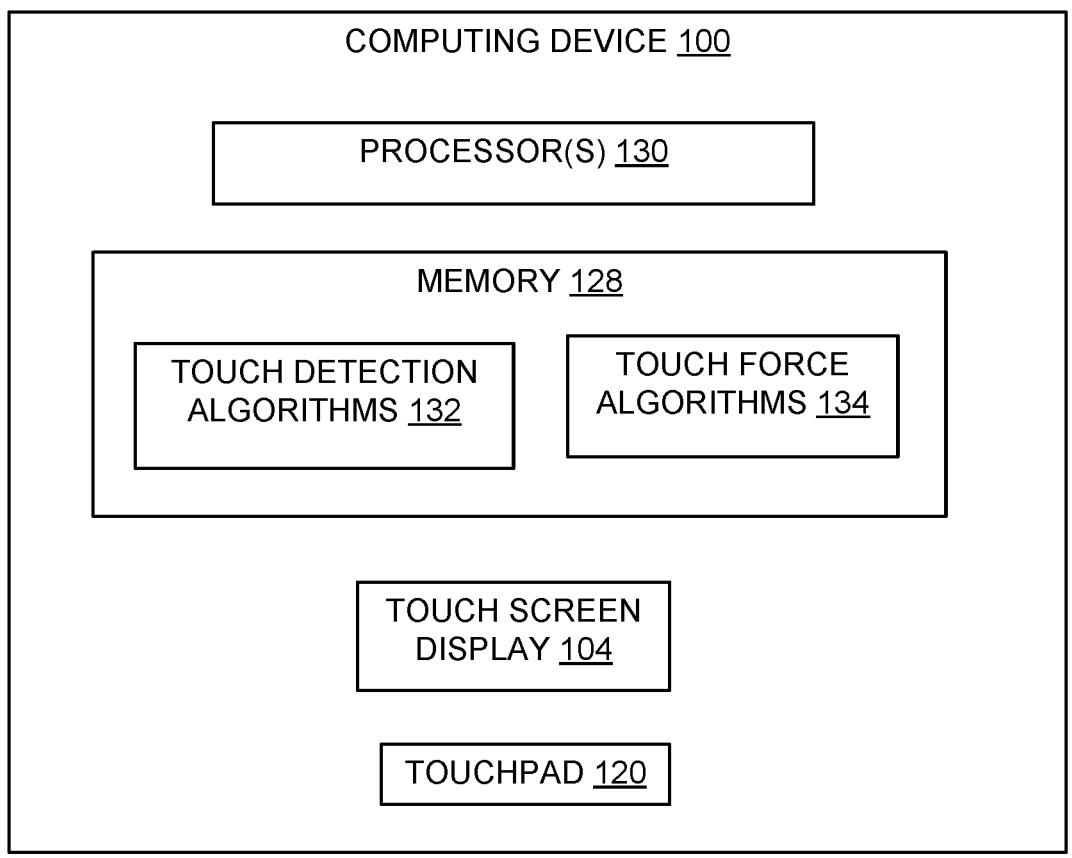
FIG. 2 shows a schematic view of selected components of the computing device of FIG. 1 according to examples of the present disclosure.

With reference now to FIG. 2, a schematic view of selected components of the example computing device 100 of FIG. 1 is provided. Computing device 100 includes memory 128 that stores instructions executable by a processor 130. For example, the memory 128 stores instructions in the form of touch detection algorithms 132 executable by the processor 130 to perform touch detection on the touchpad 120 using signals received from the touchpad. In some examples, touch detection algorithms 132 can identify particular body parts, such as one or more fingers or a palm, that are providing a touch input. For example, the touch detection algorithms can collect a plurality of touch maps corresponding to touch inputs from palms and fingers, extract features from a current touch input, and use classification techniques to determine whether the touch input corresponds to a finger(s), palm, or other body part.

As described in more detail below, memory 128 also stores instructions in the form of touch force algorithms 134 executable by the processor 130 to determine the force of a touch input on the touchpad 120. Additional details regarding memory 128, processor 130, and other components and subsystems of computing device 100 are described further below with reference to FIG. 11.

Figure 3:
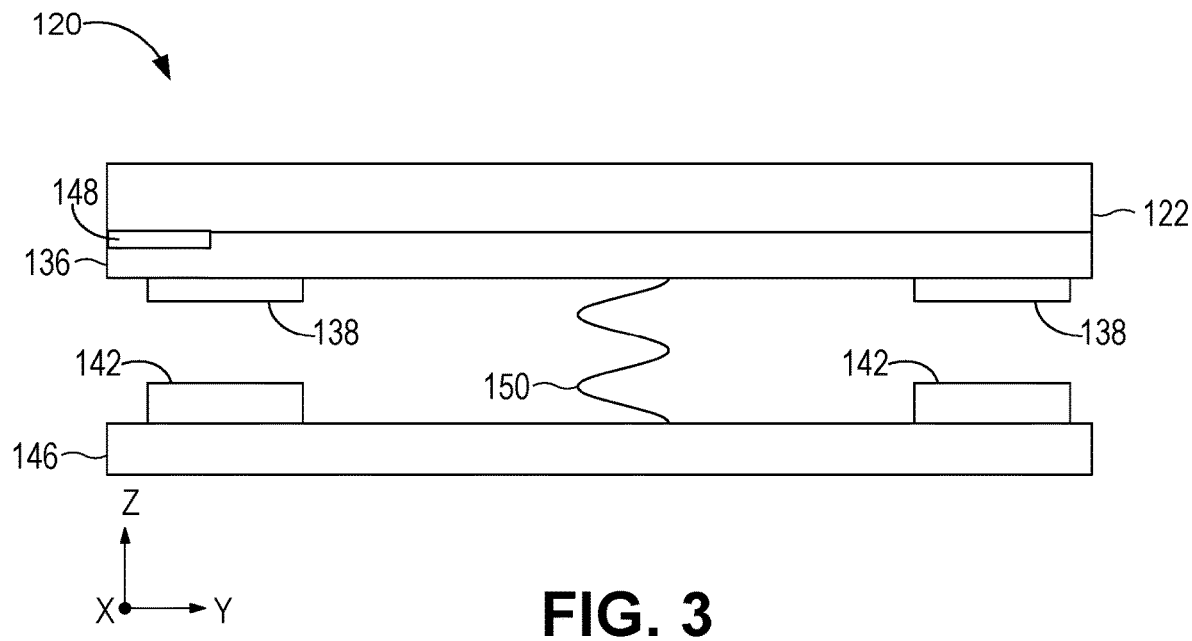
FIG. 3 shows a partial schematic cross section of the touchpad of FIG. 1.
Figure 4:
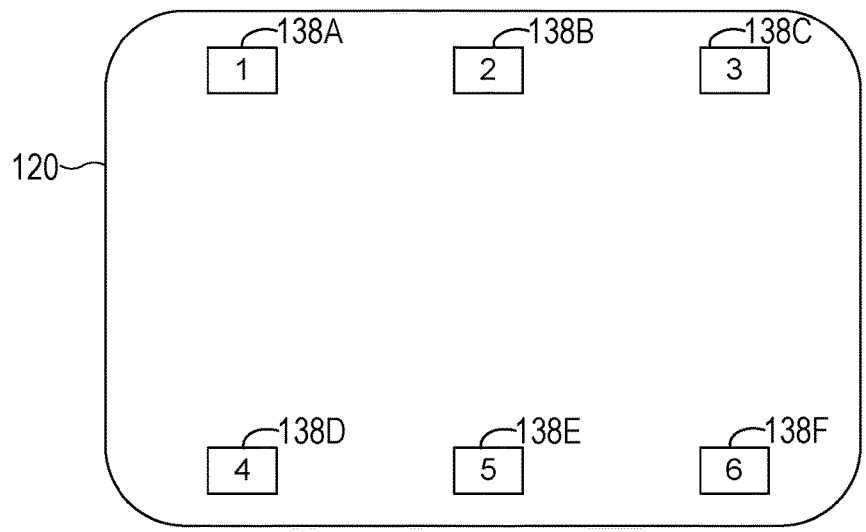
FIG. 4 shows a schematic depiction of force sensors of a touchpad according to examples of the present disclosure.

With reference now to FIG. 3, in one example touchpad 120 includes a flexible cover glass layer 122 affixed to a PCB 136 by an adhesive layer (not shown). As described further below, utilizing a flexible cover glass layer enables localized force sensing across the touchpad 120. The PCB 136 includes a plurality of capacitive force sensing electrodes (sensors) in the form of PCB electrodes 138 that are spaced from corresponding base plate electrodes 142 located on a base plate 146. In some examples, the PCB comprises a flex circuit that includes the capacitive force sensing electrode(s). With reference to FIG. 4, in one example the touchpad 120 includes six PCB electrodes 138A-138F and corresponding base plate electrodes. In other examples, touchpads of the present disclosure can utilize other suitable numbers of PCB electrodes and corresponding base plate electrodes.

As schematically indicated in FIG. 3, the PCB 136 is spaced from and resiliently supported relative to the base plate 146. In this example a spring 150 resiliently supports the PCB 136 to enable movement toward and away from the base plate 146. In other examples, a variety of other configurations can be utilized to resiliently support the PCB relative to the base plate 146. For example, two or more spring elements may extend between the PCB 136 and base plate 146, and/or the PCB 136 can be affixed at one end and extend over the base plate 146. In different examples the base plate 146 functions as a ground and can comprise a conductive material such as aluminum, a non-conductive material such as plastic, or combinations of the foregoing. In this example the PCB 136 also includes an integrated circuit 148 configured to perform touch detection functionality via the touchpad 120 using a touch sensor pattern in the upper layer of the PCB 136 to sense touch on the cover glass layer 122.

The following examples discuss aspects of the present disclosure in the context of the configuration of FIGS. 3 and 4. In other examples, a variety of other capacitance-based touchpad configurations can be utilized to practice the techniques of the present disclosure. For example, in some examples a touchpad utilizes differential capacitive sensing. These touchpads include two or more linearly-aligned electrodes that are located different distances from a corresponding PCB electrode. Because the distances are different, the capacitance between each electrode and its corresponding PCB electrode is also different. This differential capacitance between the electrodes can be used to periodically recalibrate the base height do, regardless of changes in the base height from its initial value.

As noted above, in some devices that utilize touchpads with capacitive force transducers, the distance available between the PCB sensors (electrodes) and opposing base plate electrodes is limited. When sufficient force is applied to the touchpad, a PCB sensor can "bottom out" and contact the corresponding base plate electrode, such that no additional force measurements are possible and the dynamic range of the force sensing is correspondingly limited. For example, where a user rests one palm on the trackpad and presses a finger of her other hand on the trackpad to provide input, the larger force applied by her palm will sometimes exceed a force threshold for triggering input, thereby preventing the user from providing input using her other finger.

Accordingly, and as described in more detail below, configurations of the present disclosure provide touchpad configurations and related methods that can accurately estimate a finger force exerted by a finger on a touchpad while the palm of the user's other hand is also contacting the touchpad with a larger force, and in some cases causing saturation of one or more capacitive force sensors of the touchpad. Advantageously, these configurations allow users to simultaneously rest or otherwise contact the touchpad with a palm while also providing touch input to the touchpad with one or more fingers.

Figure 9:
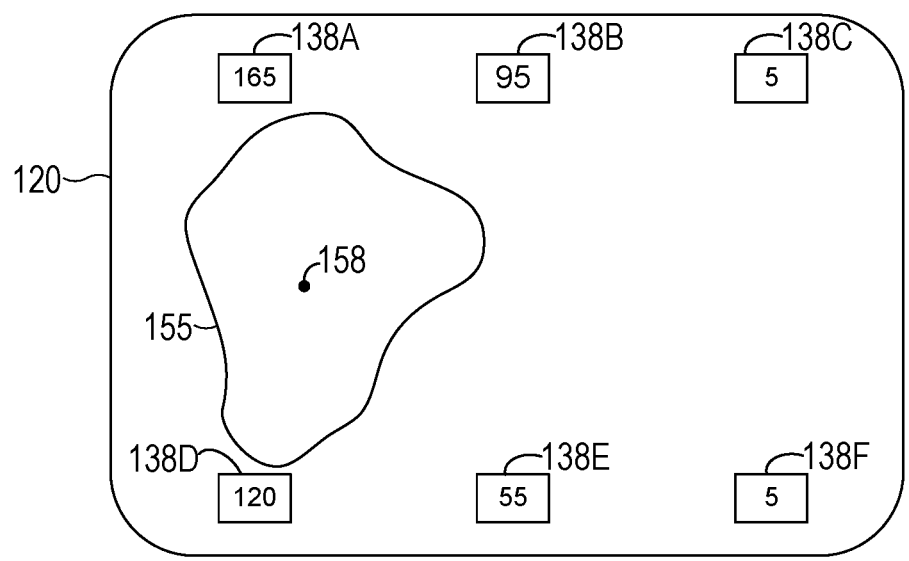
FIG. 9 shows the touchpad of FIG. 4 with an updated palm outline and palm force map according to examples of the present disclosure.
Figure 10A:
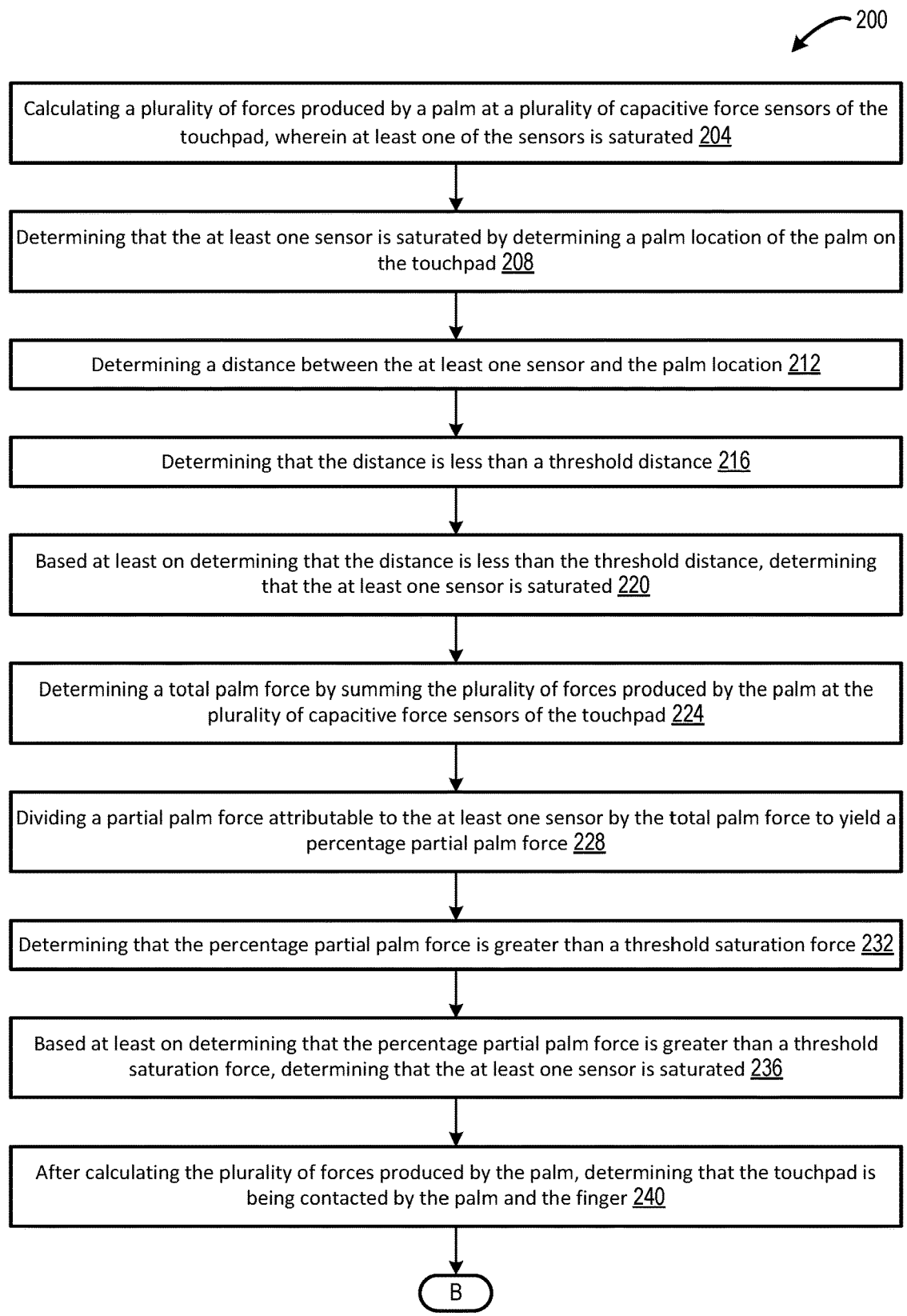
FIGS. 10A-10B are a flow chart of a method for estimating a finger force exerted by a finger on a touchpad according to examples of the present disclosure.

With reference now to FIG. 10A, a flow diagram is provided depicting an example method 200 for estimating a finger force exerted by a finger on a touchpad in a computing device according to examples of the present disclosure. The following description of method 200 is provided with reference to the touchpad 120 and related components described herein and shown in FIGS. 1-9 and 10. In other examples, method 200 is performed with other configurations of touchpads and computing devices, and in other contexts using other suitable devices and components.

Figure 5:
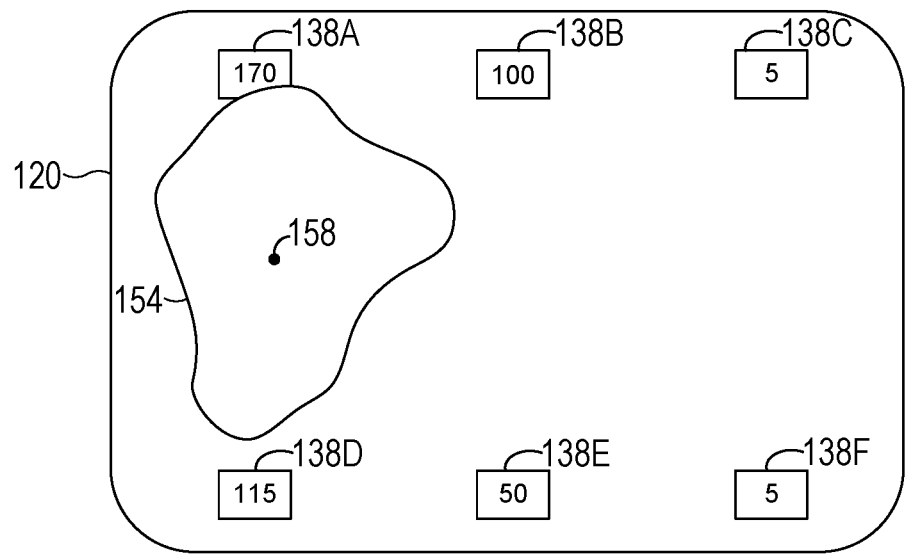
FIG. 5 shows the touchpad of FIG. 4 with a palm outline of a palm contacting the touchpad and a palm force map according to examples of the present disclosure.

At 204 and with reference also to the example of FIG. 5, method 200 includes calculating a plurality of forces produced by a palm at a plurality of capacitive force sensors of the touchpad, wherein at least one of the sensors is saturated. In the example of FIG. 5, a user is touching the touchpad 120 with her left palm and is not touching the touchpad with another finger or other body part. This contact with the touch pad is sensed by the touch sensors of the touchpad, with signals from these sensors being used to generate an outline 154 of the area of the touchpad contacted by the user's palm. Touch detection algorithms 132 utilize the signals from the touch sensors to classify this touch contact as a palm of a user as described above.

As noted above, in this example touchpad 120 includes six PCB sensors/electrodes 138A-138F and corresponding base plate electrodes 142 (not shown). FIG. 5 also shows a palm force map that indicates the force induced at each of the PCB sensors by the palm contact. In this example and in this captured frame of data represented in FIG. 5, PCB sensor 138A is receiving 170 grams (g.) of force, PCB sensor 138B is receiving 100 grams (g.) of force, PCB sensor 138C is receiving 5 grams (g.) of force, PCB sensor 138D is receiving 115 grams (g.) of force, PCB sensor 138E is receiving 50 grams (g.) of force, and PCB sensor 138F is receiving 5 grams (g.) of force.

In this example, because the palm is applying force on the left side of the trackpad 120, sensors (PCB electrodes) 138A and 138D are receiving the most force from the palm and are saturated. In some examples and as described further below, at least the force measurements at each of the six PCB electrodes 138A-138F that are captured in this frame of data are saved as a palm force map, such as in memory 128, and are subsequently utilized with force data obtained in a subsequent frame of data to determine a finger force exerted on the touchpad by the finger.

As described in more detail below, and in one potential advantage of the present disclosure, when a user subsequently contacts the touchpad 120 with a palm of one hand and one or more fingers of the other hand, and one or more force sensors are saturated, touchpad configurations described herein can utilize a saved palm force map such as FIG. 5 to determine the finger force exerted on the touchpad by the finger. Advantageously, these configurations provide accurate estimations of touch inputs provided by users' fingers when the user also contacts the touchpad with her other palm and saturates one or more force sensors. In this manner, the touchpad enables users to more freely and flexibly interact with the touchpad, such as quickly switching between typing on a keyboard and providing input via the touchpad that is accurately recognized as user input.

As described in more detail below, and in another potential advantage of the present disclosure, one or more force sensors that are saturated by the palm's contact with the touchpad can be excluded from determinations of the finger force exerted by a finger also touching the touchpad. In this manner, uncertainties and inaccuracies of the signals from saturated sensors are eliminated, and these finger force determinations can utilize signals from only the non-saturated sensors to generate accurate estimations of the finger force exerted by a finger.

In different examples touchpad configurations of the present disclosure can utilize different techniques for determining that one or more force sensors are saturated. With reference again to FIG. 10A, in one example and at 208 method 200 includes determining that at least one of the capacitive force sensors is saturated by determining a palm location of the palm on the touchpad. In one example and with reference to FIG. 5, a center of mass 158 of the palm touch outline 154 is calculated. At 212 method 200 includes determining a distance between the sensors and the palm location. In the example of FIG. 5, the distance between each of the force sensors (PCB electrodes) 138A-138F and the center of mass 158 of the palm touch outline 154 is calculated. Each of these distances is then compared to a threshold distance, and each sensor located less than the threshold distance from the center of mass 158 of the palm touch outline 154 is determined to be saturated.

With reference again to FIG. 10A, at 216 method 200 includes determining that the distance between the sensor and the palm location is less than a threshold distance. For example and with reference to FIG. 5, the distance between sensor 138A and center of mass 158 is less than the threshold distance. Accordingly and at 220 method 200 includes, based at least on determining that the distance is less than the threshold distance, determining that the sensor is saturated. In the present example of FIG. 5, force sensor 138D is also less than the threshold distance from the center of mass 158, while the other force sensors 138B, 138C, 138E, and 138F are located further away from the center of mass 158 than the threshold distance. Accordingly, in this example force sensor 138D is also determined to be saturated, and force sensors 138B, 138C, 138E, and 138F are determined to be non-saturated. As described further below, the forces attributable to the saturated force sensors are excluded from calculations of the finger force.

In other examples, individual forces attributable to each of the force sensors can be utilized to determine whether the sensor is saturated. As described further below, the force at a given force sensor is compared to a total palm force on the touchpad to determine if the sensor is saturated. With reference again to FIG. 10A, in these examples and at 224 the method 200 includes determining that at least one of the force sensors is saturated by determining a total palm force by summing the plurality of forces produced by the palm at the plurality of capacitive force sensors of the touchpad. In the example of FIG. 5, the total palm force is determined by summing the individual forces of force sensors 138A-138F. In this example, the total palm force is 445 g.

At 228 method 200 includes dividing a partial palm force attributable to a sensor by the total palm force to yield a percentage partial palm force. In the present example for force sensor 138A, its partial palm force of 170 g. is divided by the total palm force of 445 g. to yield a percentage partial palm force of 38.2% for this sensor. For force sensor 138D, its partial palm force of 115 g. is divided by the total palm force of 445 g. to yield a percentage partial palm force of 25.8% for this sensor. For force sensor 138B, its partial palm force of 100 g. is divided by the total palm force of 445 g. to yield a percentage partial palm force of 22.5% for this sensor. Percentage partial palm forces for the other sensors 138C, 138E and 138F are similarly calculated.

Each of the percentage partial palm forces are compared to the threshold percentage saturation force to determine if the corresponding sensor is saturated. In the present example, a threshold percentage saturation force of 25.0% is utilized. Regarding force sensor 138A, its percentage partial palm force of 38.2% exceeds the threshold percentage saturation force of 25.0%. Thus, force sensor 138A is determined to be saturated. Accordingly and with reference again to FIG. 10A, at 232 method 200 includes determining that the percentage partial palm force is greater than a threshold saturation force. At 236 method 200 includes, based at least on determining that the percentage partial palm force is greater than the threshold saturation force, determining that the sensor is saturated. In one potential advantage of this configuration, by utilizing percentage partial palm forces to determine whether sensors are saturated, corresponding threshold percentage saturation forces can be easily updated based on actual use metrics and/or other factors to calibrate these threshold forces over time and accommodate structural changes to the touchpad and other factors that can affect sensor effective ranges and corresponding saturation levels.

In the present example, the percentage partial palm force of 25.8% of force sensor 138D also exceeds the threshold percentage saturation force of 25.0%. Accordingly, force sensor 138D also is determined to be saturated. The percentage partial palm forces of the other four sensors 138B, 138C, 138E, and 138F are all below the threshold percentage saturation force of 25.0%. Accordingly, each of these sensors are determined to be non-saturated. It will be appreciated that the foregoing example use case is merely an illustrative example. In other examples, a single force sensor or more than two force sensors can be saturated, and any suitable threshold percentage saturation force can be utilized.

Figure 6:
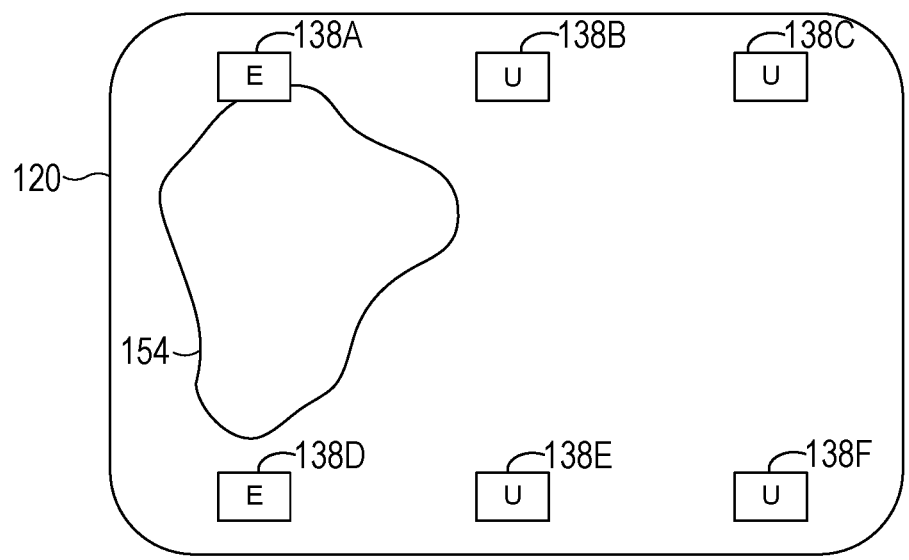
FIG. 6 shows the touchpad of FIG. 5 with excluded (saturated) and utilized (non-saturated) force sensors according to examples of the present disclosure.

As noted above, and in one potential advantage of the present disclosure, the one or more force sensors that are saturated by the palm's contact with the touchpad can be excluded from determinations of the finger force exerted by a finger also touching the touchpad. In the present example and as described further below, in a subsequent frame of data the two saturated force sensors 138A and 138D are excluded from determinations of the finger force exerted by a finger on the touchpad. FIG. 6 schematically illustrates the exclusion of force sensors 138A and 138D with the designation "E" (for Excluded) while the other four force sensors 138B, 138C, 138E, and 138F are designated "U" (for Utilized) to indicate that their measurements are utilized in determining the finger force exerted by a finger on the touchpad. In some examples, the force measurements at all six of the force sensors 138A-138F are saved in a palm force map as noted above, with the force measurements of the two excluded force sensors 138A and 138D later excluded from a determination the finger force exerted by a finger. In other examples, only the force measurements from the four utilized (non-excluded) force sensors 138A-138F are saved in a palm force map.

Figure 10B:
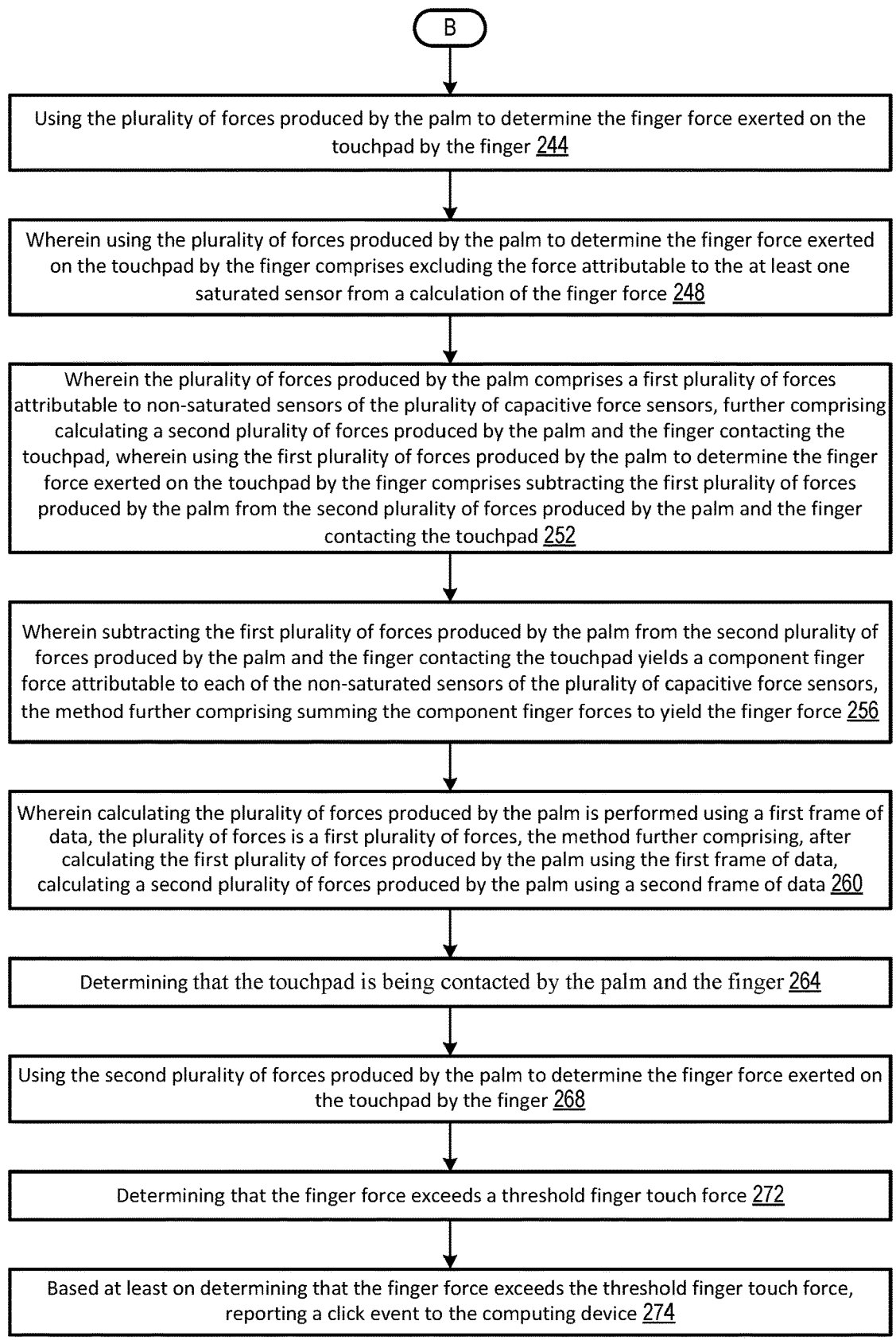

Accordingly, with reference again to FIG. 10A, after calculating the plurality of forces produced by the palm in a first frame of data and saving such forces in a palm force map, at 240 the method 200 includes, using a second, subsequent frame of data, determining that the touchpad is being contacted by the palm and the finger. With reference now to FIG. 10B, at 244 and as described in more detail below, method 200 includes using the plurality of forces produced by the palm (from the saved palm force map) to determine the finger force exerted on the touchpad by the finger. Also and as noted above, at 248 method 200 includes excluding the force attributable to the saturated sensor(s) from a calculation of the finger force.

As described above, where the first plurality of forces produced by the palm in the palm force map are attributable to the non-saturated force sensors, at 252 and as described further below, method 200 includes calculating a second plurality of forces produced by the palm and a finger contacting the touchpad in a subsequent frame of data. In this manner, the first plurality of forces produced by the palm in the prior frame of data are used to determine the finger force exerted on the touchpad by the finger in the subsequent frame of data by subtracting the first plurality of forces from the second plurality of forces produced by the palm and the finger contacting the touchpad. Advantageously and as described further below, by excluding the saturated force sensors and using the non-saturated force sensors to determine the finger force, an accurate estimation of the finger force can be obtained even when one or more force sensors are saturated.

Figure 7:
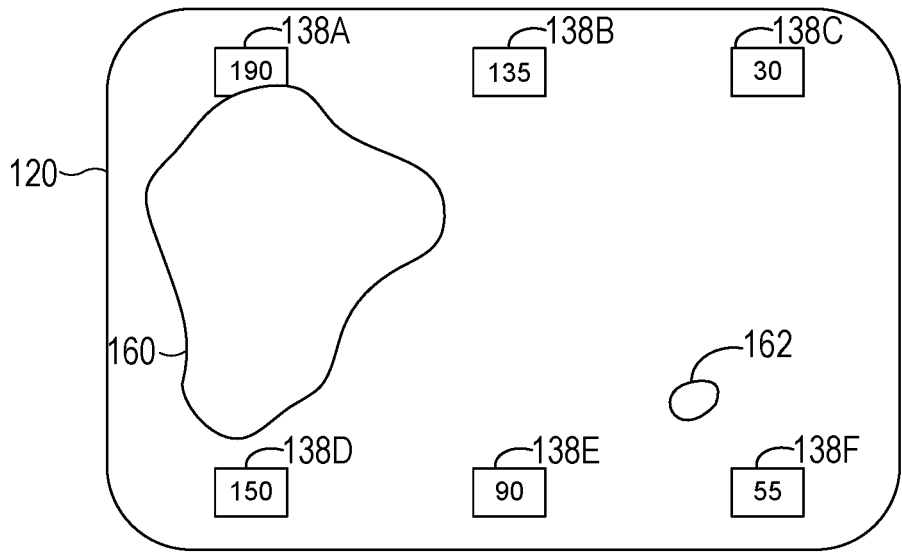
FIG. 7 shows the touchpad of FIG. 4 with another palm outline of a palm and a finger outline of a finger contacting the touchpad according to examples of the present disclosure.

In one example and with reference now to FIG. 7, a palm and finger force map is depicted showing forces at each of the force sensors 138A-138F produced by the user's left palm and her right index finger contacting the touchpad 120 and captured in a subsequent frame of data sampled after the frame corresponding to the palm force map. In this example, the user is touching the touchpad 120 with her left palm and with the index finger of her right hand. This contact with the touch pad is sensed by the touch sensors of the touchpad, with signals from these sensors being used to generate a palm outline 160 of the area of the touchpad contacted by the user's palm and a finger outline 162 of the area of the touchpad contacted by her right index finger. Touch detection algorithms 132 utilize the signals from the touch sensors to classify these touch contacts as a palm and a finger of the user, respectively.

FIG. 7 also shows a palm-plus-finger force map that indicates the force induced at each of the PCB sensors by the palm and finger contacts. In this example and in this captured frame of data represented in FIG. 7, PCB sensor 138A is receiving 190 grams (g.) of force, PCB sensor 138B is receiving 135 grams (g.) of force, PCB sensor 138C is receiving 30 grams (g.) of force, PCB sensor 138D is receiving 150 grams (g.) of force, PCB sensor 138E is receiving 90 grams (g.) of force, and PCB sensor 138F is receiving 55 grams (g.) of force.

In another potential advantage of the present disclosure and as noted above, the saturated force sensors can be excluded and the non-saturated sensors utilized to determine the finger force exerted by the user's finger on the touchpad. In one example and with reference again to FIG. 10B, at 256 method 200 includes, wherein subtracting the first plurality of forces produced by the palm (as represented in the saved palm force map) from the second plurality of forces produced by the palm and the finger contacting the touchpad yields a component finger force attributable to each of the non-saturated sensors.

Figure 8:
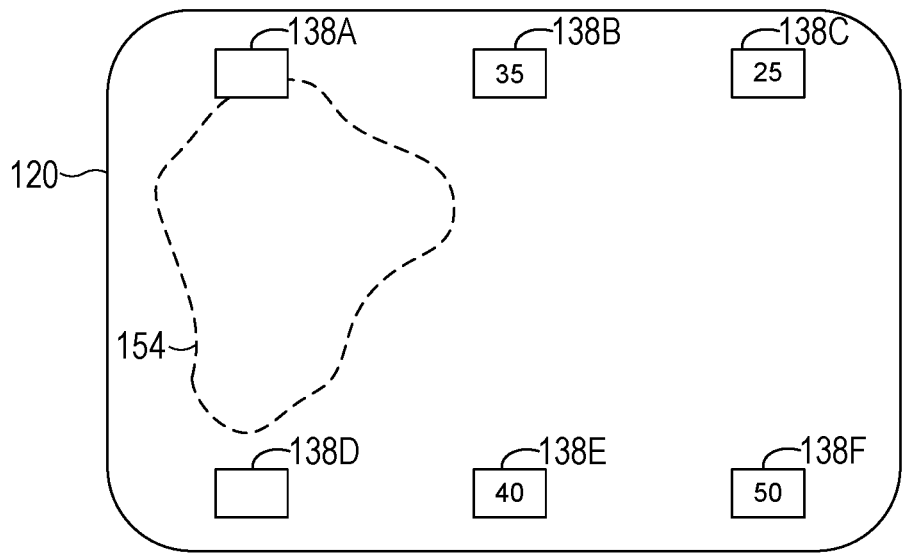
FIG. 8 shows the touchpad of FIG. 7 with a force map resulting from subtracting the forces at the non-saturated force sensors of FIG. 5 from the forces at these sensors in the subsequent frame of data in FIG. 7 according to examples of the present disclosure.

With reference now to FIG. 8, this force map shows the results of subtracting the forces at the non-saturated force sensors 138B, 138C, 138E, and 138F in the palm force map of FIG. 5 from the forces measured at these same four force sensors in the subsequent frame of data represented in FIG. 7. In this example, force sensors 138B, 138C, 138E, and 138F have component finger forces of 35 g., 25 g., 40 g., and 50 gr., respectively. As illustrated, the forces at saturated sensors 138A and 138D are excluded and not considered.

With reference again to FIG. 10B, at 256 method 200 further includes summing the component finger forces at each of the non-saturated sensors to yield the finger force. In this example, summing the component finger forces of force sensors 138B, 138C, 138E, and 138F gives a total estimated finger force of 150 g. Advantageously, in this manner and as noted above, where a user is contacting the touchpad with her palm and a finger and one or more force sensors are saturated, configurations of the present disclosure can provide accurate estimations of the force applied by the finger to the touchpad.

In some examples, configurations of the present disclosure can periodically recalculate and save an updated palm force map to be utilized with a subsequent frame of data to determine the force applied by a finger to the touchpad. In some examples, at 260 the method 200 includes, wherein calculating the plurality of forces produced by the palm is performed using a first frame of data, and the plurality of forces is a first plurality of forces, after calculating the first plurality of forces produced by the palm using the first frame of data, calculating a second plurality of forces produced by the palm using a second frame of data.

For example and with reference to FIG. 9, after the first palm force map of FIG. 5 was calculated using the first frame of data, the user again touches the touchpad 120 with her left palm and is not touching the touchpad with another finger or other body part. This contact with the touch pad is sensed by the touch sensors of the touchpad, with signals from these sensors being used to generate an outline 155 of the area of the touchpad contacted by the user's palm. Touch detection algorithms 132 utilize the signals from the touch sensors to classify this touch contact as a palm of a user.

In this example and in this captured frame of data represented in FIG. 9, the palm outline 155 is slightly lower on the touchpad than in the earlier frame of captured data shown in FIG. 5. Accordingly, force sensors 138A, 138B, 138D, and 138E measure slightly different forces. As described above, the force measurements at each of the six PCB sensors 138A-138F that are captured in this frame of data are saved as an updated palm force map, such as in memory 128, and are subsequently utilized with force data obtained in a subsequent frame of data to determine the finger force exerted on the touchpad by a finger. Accordingly and with reference again to FIG. 10B, at 264 method 200 includes, using a subsequent frame of data, determining that the touchpad is being contacted by a palm and a finger. And at 268 method 200 includes using the second plurality of forces produced by the palm in the updated palm force map to determine the finger force exerted on the touchpad by the finger as described above.

Advantageously and in these examples, configurations of the present disclosure can periodically recalculate and save an updated palm force map, and utilize the updated map with a subsequent frame of data to determine the force applied by a finger to the touchpad. In this manner, these examples utilize a more recent palm force map that can more closely represent the actual forces induced by the user's palm at the subsequent frame of data.

In different examples the finger force exerted on the touchpad by the user's finger can be utilized in a variety of manners to provide input to the computing device 100. In some examples and with reference again to FIG. 10B, at 272 method 200 includes determining that the finger force exceeds a threshold finger touch force. At 274 method 200 includes, based at least on determining that the finger force exceeds the threshold finger touch force, reporting click event to the computing device. In different examples the click event can be a selection of a displayed item or other user input. In some examples, when the finger force exceeds the threshold finger touch force, the method includes actuating a haptic feedback component to produce haptic feedback, such as a mechanical click. Advantageously in these examples, by accurately estimating the touch force exerted on the touchpad by a finger, even when the user's palm is also contacting the touchpad, the user can effectively provide touch inputs to the trackpad without moving or repositioning their other hand.

Figure 11:
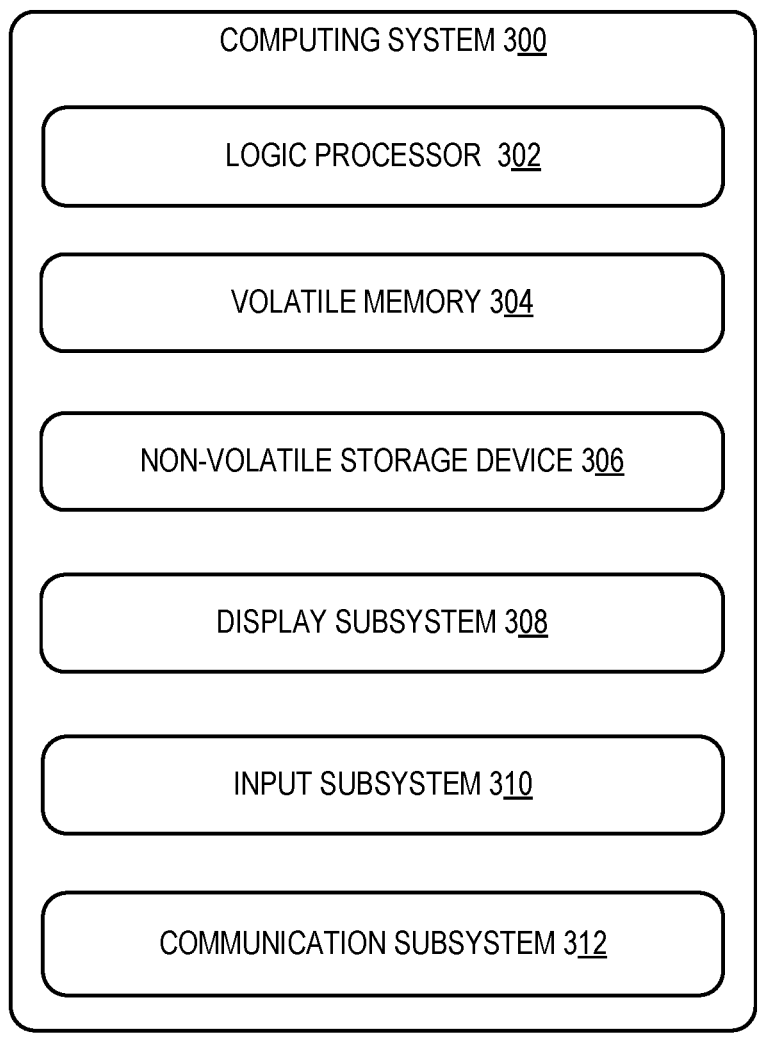
FIG. 11 shows a block diagram of an example computing system according to examples of the present disclosure.

In some embodiments, the touchpads and components described herein may be utilized with a computing system of one or more computing devices. Similarly, the methods and processes described herein may be implemented as a computer-application program or service, an application-programming interface (API), a library, and/or other computer-program product. FIG. 11 schematically shows a non-limiting embodiment of a computing system 300 configured to provide any to all of the compute functionality described herein. Computing system 300 is shown in simplified form.

The laptop computing device 100 described above may comprise computing system 300 or one or more aspects of computing system 300. Computing system 300 may take the form of one or more laptops, personal computers, server computers, tablet computers, home-entertainment computers, gaming devices, mobile computing devices, mobile communication devices (e.g., smart phone), wearable computing devices, and/or other computing devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 11.

Logic processor 302 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory (RAM). Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

Input subsystem 310 may comprise or interface with one or more user-input devices such as touchpad 120, keyboard 124, touch screen display 104, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a method for estimating a finger force exerted by a finger on a touchpad in a computing device, the method comprising: calculating a plurality of forces produced by a palm at a plurality of capacitive force sensors of the touchpad, wherein at least one of the sensors is saturated; after calculating the plurality of forces produced by the palm, determining that the touchpad is being contacted by the palm and the finger; and using the plurality of forces produced by the palm to determine the finger force exerted on the touchpad by the finger. The method may additionally or alternatively include, wherein using the plurality of forces produced by the palm to determine the finger force exerted on the touchpad comprises excluding the force attributable to the at least one saturated sensor from a calculation of the finger force. The method may additionally or alternatively include determining that the at least one sensor is saturated by: determining a palm location of the palm on the touchpad; determining a distance between the at least one sensor and the palm location; determining that the distance is less than a threshold distance; and based at least on determining that the distance is less than the threshold distance, determining that the at least one sensor is saturated. The method may additionally or alternatively include determining that the at least one sensor is saturated by: determining a total palm force by summing the plurality of forces produced by the palm at the plurality of capacitive force sensors of the touchpad; dividing a partial palm force attributable to the at least one sensor by the total palm force to yield a percentage partial palm force; determining that the percentage partial palm force is greater than a threshold percentage saturation force; and based at least on determining that the percentage partial palm force is greater than the threshold percentage saturation force, determining that the at least one sensor is saturated. The method may additionally or alternatively include, wherein the plurality of forces produced by the palm comprises a first plurality of forces attributable to non-saturated sensors of the plurality of capacitive force sensors, further comprising calculating a second plurality of forces produced by the palm and the finger contacting the touchpad, wherein using the plurality of forces produced by the palm to determine the finger force exerted on the touchpad by the finger comprises subtracting the first plurality of forces produced by the palm from the second plurality of forces produced by the palm and the finger contacting the touchpad. The method may additionally or alternatively include, wherein subtracting the first plurality of forces produced by the palm from the second plurality of forces produced by the palm and the finger contacting the touchpad yields a component finger force attributable to each of the non-saturated sensors of the plurality of capacitive force sensors, the method further comprising summing the component finger forces to yield the finger force. The method may additionally or alternatively include, wherein calculating the plurality of forces produced by the palm is performed using a first frame of data, the plurality of forces is a first plurality of forces, the method further comprising, after calculating the first plurality of forces produced by the palm using the first frame of data: calculating a second plurality of forces produced by the palm using a second frame of data; determining that the touchpad is being contacted by the palm and the finger; and using the second plurality of forces produced by the palm to determine the finger force exerted on the touchpad by the finger. The method may additionally or alternatively include, determining that the finger force exceeds a threshold finger touch force; and based at least on determining that the finger force exceeds the threshold finger touch force, reporting a click event to the computing device.

Another aspect provides a computing device, comprising: a force sensing touchpad comprising: a base plate comprising a plurality of base electrodes; and a plurality of capacitive force sensors resiliently spaced from the base plate; a processor; and a memory storing instructions executable by the processor to: calculate a plurality of forces produced by a palm at the plurality of capacitive force sensors, wherein at least one of the sensors is saturated; after calculating the plurality of forces produced by the palm, determine that the touchpad is being contacted by the palm and a finger; and using the plurality of forces produced by the palm to determine the finger force exerted on the touchpad by the finger. The computing device may additionally or alternatively include, wherein the force sensing touchpad comprises a printed circuit board (PCB) comprising the plurality of capacitive force sensors and a flexible glass substrate affixed to the PCB. The computing device may additionally or alternatively include, wherein using the plurality of forces produced by the palm to determine the finger force exerted on the touchpad by the finger comprises excluding the force attributable to the at least one saturated sensor from a calculation of the finger force. The computing device may additionally or alternatively include, wherein the instructions are executable to determine that the at least one sensor is saturated by: determining a palm location of the palm on the touchpad; determining a distance between the at least one of the sensors and the palm location; determining that the distance is less than a threshold distance; and based at least on determining that the distance is less than the threshold distance, determining that the at least one sensor is saturated. The computing device may additionally or alternatively include, wherein the instructions executable to determine that the at least one sensor is saturated by: determining a total palm force by summing the plurality of forces produced by the palm at the plurality of capacitive force sensors of the touchpad; dividing a partial palm force attributable to the at least one of the sensors by the total palm force to yield a percentage partial palm force; determining that the percentage partial palm force is greater than a threshold percentage saturation force; and based at least on determining that the percentage partial palm force is greater than the threshold percentage saturation force, determining that the at least one sensor is saturated. The computing device may additionally or alternatively include, wherein the plurality of forces produced by the palm comprises a first plurality of forces attributable to non-saturated sensors of the plurality of capacitive force sensors, the instructions executable to calculate a second plurality of forces produced by the palm and the finger contacting the touchpad, wherein using the plurality of forces produced by the palm to determine the finger force exerted on the touchpad by the finger comprises subtracting the first plurality of forces produced by the palm from the second plurality of forces produced by the palm and the finger contacting the touchpad. The computing device may additionally or alternatively include, wherein subtracting the first plurality of forces produced by the palm from the second plurality of forces produced by the palm and the finger contacting the touchpad yields a component finger force attributable to each of the non-saturated sensors of the plurality of capacitive force sensors, the instructions executable to sum the component finger forces to yield the finger force. The computing device may additionally or alternatively include, wherein calculating the plurality of forces produced by the palm is performed using a first frame of data, the plurality of forces is a first plurality of forces, the instructions executable to, after calculating the first plurality of forces produced by the palm using a first frame of data: calculate a second plurality of forces produced by the palm using a second frame of data; determine that the touchpad is being contacted by the palm and the finger; and use the second plurality of forces produced by the palm to determine the finger force exerted on the touchpad by the finger. The computing device may additionally or alternatively include, wherein the instructions executable to: determine that the finger force exceeds a threshold finger touch force; and based at least on determining that the finger force exceeds the threshold finger touch force, report a click event to the computing device.

Another aspect provides a computing device, comprising: a force sensing touchpad comprising: a base plate comprising a plurality of base electrodes; a printed circuit board (PCB) resiliently spaced from the base plate and comprising a plurality of capacitive force sensors; and flexible glass substrate affixed to the PCB; a processor; and a memory storing instructions executable by the processor to: calculate a first plurality of forces produced by a palm and attributable to non-saturated sensors of the plurality of capacitive force sensors, wherein at least one sensor of the plurality of capacitive force sensors is saturated; after calculating the first plurality of forces produced by the palm, determine that the touchpad is being contacted by the palm and a finger; calculate a second plurality of forces produced by the palm and the finger contacting the touchpad, and subtracting the first plurality of forces produced by the palm from the second plurality of forces produced by the palm and the finger contacting the touchpad to determine the finger force exerted on the touchpad by the finger. The computing device may additionally or alternatively include, wherein subtracting the first plurality of forces produced by the palm from the second plurality of forces produced by the palm and the finger contacting the touchpad yields a component finger force attributable to each of the non-saturated sensors of the plurality of capacitive force sensors, the instructions executable to sum the component finger forces to yield the finger force. The computing device may additionally or alternatively include, wherein calculating the plurality of forces produced by the palm is performed using a first frame of data, the plurality of forces is a first plurality of forces, the instructions executable to, after calculating the first plurality of forces produced by the palm using a first frame of data: calculate a second plurality of forces produced by the palm using a second frame of data; determine that the touchpad is being contacted by the palm and the finger; and use the second plurality of forces produced by the palm to determine the finger force exerted on the touchpad by the finger.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for estimating a finger force exerted by a finger on a touchpad in a computing device, the method comprising:
    calculating a plurality of forces produced by a palm at a plurality of capacitive force sensors of the touchpad, wherein at least one of the sensors is saturated with a magnitude of force;
    after calculating the plurality of forces produced by the palm, determining that the touchpad is being contacted by the palm and the finger; and
    using the plurality of forces produced by the palm to determine the estimated finger force exerted on the touchpad by the finger.

2. The method of claim 1, wherein using the plurality of forces produced by the palm to determine the estimated finger force exerted on the touchpad comprises excluding the force attributable to the at least one saturated sensor from a calculation of the estimated finger force.

3. The method of claim 1, further comprising determining that the at least one sensor is saturated by:
    determining a palm location of the palm on the touchpad;
    determining a distance between the at least one sensor and the palm location;
    determining that the distance is less than a threshold distance; and
    based at least on determining that the distance is less than the threshold distance, determining that the at least one sensor is saturated.

4. The method of claim 1, further comprising determining that the at least one sensor is saturated by:
    determining a total palm force by summing the plurality of forces produced by the palm at the plurality of capacitive force sensors of the touchpad;
    dividing a partial palm force attributable to the at least one sensor by the total palm force to yield a percentage partial palm force;
    determining that the percentage partial palm force is greater than a threshold percentage saturation force; and
    based at least on determining that the percentage partial palm force is greater than the threshold percentage saturation force, determining that the at least one sensor is saturated.

5. The method of claim 1, wherein the plurality of forces produced by the palm comprises a first plurality of forces attributable to non-saturated sensors of the plurality of capacitive force sensors, further comprising calculating a second plurality of forces produced by the palm and the finger contacting the touchpad, wherein using the plurality of forces produced by the palm to determine the estimated finger force exerted on the touchpad by the finger comprises subtracting the first plurality of forces produced by the palm from the second plurality of forces produced by the palm and the finger contacting the touchpad.

6. The method of claim 5, wherein subtracting the first plurality of forces produced by the palm from the second plurality of forces produced by the palm and the finger contacting the touchpad yields a component finger force attributable to each of the non-saturated sensors of the plurality of capacitive force sensors, the method further comprising summing the component finger forces to yield the estimated finger force.

7. The method of claim 1, wherein calculating the plurality of forces produced by the palm is performed using a first frame of data, the plurality of forces is a first plurality of forces, the method further comprising, after calculating the first plurality of forces produced by the palm using the first frame of data:
    calculating a second plurality of forces produced by the palm using a second frame of data;
    determining that the touchpad is being contacted by the palm and the finger; and
    using the second plurality of forces produced by the palm to determine the estimated finger force exerted on the touchpad by the finger.

8. The method of claim 1, further comprising:
    determining that the estimated finger force exceeds a threshold finger touch force; and
    based at least on determining that the estimated finger force exceeds the threshold finger touch force, reporting a click event to the computing device.

9. A computing device, comprising:
    a force sensing touchpad comprising:
        a base plate comprising a plurality of base electrodes; and
        a plurality of capacitive force sensors resiliently spaced from the base plate;
    a processor; and
    a memory storing instructions executable by the processor to:
        calculate a plurality of forces produced by a palm at the plurality of capacitive force sensors, wherein at least one of the sensors is saturated with a magnitude of force;
        after calculating the plurality of forces produced by the palm, determine that the touchpad is being contacted by the palm and a finger; and
        using the plurality of forces produced by the palm to determine an estimated finger force exerted on the touchpad by the finger.

10. The computing device of claim 9, wherein the force sensing touchpad comprises a printed circuit board (PCB)

comprising the plurality of capacitive force sensors and a flexible glass substrate affixed to the PCB.

11. The computing device of claim 9, wherein using the plurality of forces produced by the palm to determine the estimated finger force exerted on the touchpad by the finger comprises excluding the force attributable to the at least one saturated sensor from a calculation of the estimated finger force.

12. The computing device of claim 9, the instructions executable to determine that the at least one sensor is saturated by:
   determining a palm location of the palm on the touchpad;
   determining a distance between the at least one of the sensors and the palm location;
   determining that the distance is less than a threshold distance; and
   based at least on determining that the distance is less than the threshold distance, determining that the at least one sensor is saturated.

13. The computing device of claim 9, the instructions executable to determine that the at least one sensor is saturated by:
   determining a total palm force by summing the plurality of forces produced by the palm at the plurality of capacitive force sensors of the touchpad;
   dividing a partial palm force attributable to the at least one of the sensors by the total palm force to yield a percentage partial palm force;
   determining that the percentage partial palm force is greater than a threshold percentage saturation force; and
   based at least on determining that the percentage partial palm force is greater than the threshold percentage saturation force, determining that the at least one sensor is saturated.

14. The computing device of claim 9, wherein the plurality of forces produced by the palm comprises a first plurality of forces attributable to non-saturated sensors of the plurality of capacitive force sensors, the instructions executable to calculate a second plurality of forces produced by the palm and the finger contacting the touchpad, wherein using the plurality of forces produced by the palm to determine the estimated finger force exerted on the touchpad by the finger comprises subtracting the first plurality of forces produced by the palm from the second plurality of forces produced by the palm and the finger contacting the touchpad.

15. The computing device of claim 14, wherein subtracting the first plurality of forces produced by the palm from the second plurality of forces produced by the palm and the finger contacting the touchpad yields a component finger force attributable to each of the non-saturated sensors of the plurality of capacitive force sensors, the instructions executable to sum the component finger forces to yield the estimated finger force.

16. The computing device of claim 9, wherein calculating the plurality of forces produced by the palm is performed using a first frame of data, the plurality of forces is a first plurality of forces, the instructions executable to, after calculating the first plurality of forces produced by the palm using a first frame of data:
   calculate a second plurality of forces produced by the palm using a second frame of data;
   determine that the touchpad is being contacted by the palm and the finger; and
   use the second plurality of forces produced by the palm to determine the estimated finger force exerted on the touchpad by the finger.

17. The computing device of claim 9, the instructions executable to:
   determine that the estimated finger force exceeds a threshold finger touch force; and
   based at least on determining that the estimated finger force exceeds the threshold finger touch force, report a click event to the computing device.

18. A computing device, comprising:
   a force sensing touchpad comprising:
      a base plate comprising a plurality of base electrodes;
      a printed circuit board (PCB) resiliently spaced from the base plate and comprising a plurality of capacitive force sensors; and
      flexible glass substrate affixed to the PCB;
   a processor; and
   a memory storing instructions executable by the processor to:
      calculate a first plurality of forces produced by a palm and attributable to non-saturated sensors of the plurality of capacitive force sensors, wherein at least one sensor of the plurality of capacitive force sensors is saturated;
      after calculating the first plurality of forces produced by the palm, determine that the touchpad is being contacted by the palm and a finger;
      calculate a second plurality of forces produced by the palm and the finger contacting the touchpad, and
      subtracting the first plurality of forces produced by the palm from the second plurality of forces produced by the palm and the finger contacting the touchpad to determine an estimated finger force exerted on the touchpad by the finger.

19. The computing device of claim 18, wherein subtracting the first plurality of forces produced by the palm from the second plurality of forces produced by the palm and the finger contacting the touchpad yields a component finger force attributable to each of the non-saturated sensors of the plurality of capacitive force sensors, the instructions executable to sum the component finger forces to yield the estimated finger force.

20. The computing device of claim 18, wherein calculating the plurality of forces produced by the palm is performed using a first frame of data, the plurality of forces is a first plurality of forces, the instructions executable to, after calculating the first plurality of forces produced by the palm using a first frame of data:
   calculate a second plurality of forces produced by the palm using a second frame of data;
   determine that the touchpad is being contacted by the palm and the finger; and
   use the second plurality of forces produced by the palm to determine the estimated finger force exerted on the touchpad by the finger.

* * * * *